United States Patent
Wong et al.

(10) Patent No.: US 11,195,078 B1
(45) Date of Patent: Dec. 7, 2021

(54) ARTIFICIAL INTELLIGENCE (AI)-BASED ROBOTIC PROCESS AUTOMATION (RPA) FOR INDEPENDENT INSURANCE SALES AGENT

(71) Applicant: Lucas GC Limited, Hong Kong (HK)

(72) Inventors: Wang-Chan Wong, Irvine, CA (US); Howard Lee, Porter Ranch, CA (US)

(73) Assignee: Lucas GC Limited, Hong Kong (HK)

( * ) Notice: Subject to any disclaimer, the term of this patent is extended or adjusted under 35 U.S.C. 154(b) by 0 days.

(21) Appl. No.: 17/368,777

(22) Filed: Jul. 6, 2021

(51) Int. Cl.
*G06N 3/00* (2006.01)
*G06N 3/04* (2006.01)
*G06Q 40/08* (2012.01)
*G06N 5/00* (2006.01)
*G06N 3/08* (2006.01)

(52) U.S. Cl.
CPC ............... *G06N 3/008* (2013.01); *G06N 3/04* (2013.01); *G06N 3/08* (2013.01); *G06N 5/003* (2013.01); *G06Q 40/08* (2013.01)

(58) Field of Classification Search
None
See application file for complete search history.

(56) References Cited

U.S. PATENT DOCUMENTS

| | | | | |
|---|---|---|---|---|
| 2015/0178787 A1* | 6/2015 | Rudrappa | ......... | G06Q 30/0269 705/14.66 |
| 2019/0147366 A1* | 5/2019 | Sankaran | ............. | G06N 3/0445 706/12 |
| 2020/0372578 A1* | 11/2020 | Al-Masoud | ............ | G06Q 40/04 |
| 2021/0166322 A1* | 6/2021 | Allen | ..................... | G06Q 40/08 |

* cited by examiner

*Primary Examiner* — Alan Chen
(74) *Attorney, Agent, or Firm* — Helen Mao; Imperium Patent Works (57) ABSTRACT

Methods and systems are provided for AI-based robotic automation for persuasive references. In one novel aspect, a robotic persuasive reference is generated based on a prospect product-service (P_PS) matrix, which is generated based on predictive analysis using DNN model and dynamically obtained feedbacks. In one embodiment, the DNN model is trained with customer personal profiles against associated PS revenues for each customer data set. In one embodiment, the predictive analysis uses a decision tree classifier. In one embodiment, the computer system detects one or more predefined triggering events comprising feedback information for the robotic persuasive reference and one or more predefined lifetime events, updates the P_PS matrix based and the robotic persuasive reference accordingly. In one embodiment, the feedback information is a sentiment analysis on responses from the prospect. In another embodiment, a recency, frequency, and page browsing analysis is performed based on the one or more detected lifetime events.

20 Claims, 6 Drawing Sheets

ARTIFICIAL INTELLIGENCE (AI)-BASED ROBOTIC PROCESS AUTOMATION (RPA) FOR INDEPENDENT INSURANCE SALES AGENT

TECHNICAL FIELD

The present invention relates generally to artificial intelligence (AI) automation and, more particularly, an AI-based robotic process automation for independent insurance sales agents.

BACKGROUND

Based on the U.S. Department of Labor, the U.S. insurance industry employed 2.8 million people in 2019. Among them, 1.6 million worked for insurance companies, including life and health insurers, P/C insurers (647,000 workers) and reinsurers (28,500 workers). The remaining 1.2 million people worked for insurance agencies, brokers, and other insurance-related enterprises. There are three different methods to buy insurance. These methods include buying directly through the internet or going through captive agents or independent agents. Buying directly through the internet is getting popular. In fact, many commodity-like insurance policies such as auto, property and some healthy insurances, can be purchased directly online. It is particularly true for the younger generations who are used to online shopping. However, there is a misconception that millennials are all in for online process. It has been proven that millennials want digital first, but not digital alone. It is particularly true when the insurance product is complicated or it is for a long-term financial investment such as life insurance, retirements, etc. That makes it more critical to cultivate these future customers by combining great online digital user experience and by supplementing it with person-to-person counseling and persuasion. Therefore, insurance sales agents are still the major driving force to acquire new customers. A captive agent works for only one insurance provider and is paid by that company. The customer will deal with the insurance provider directly. On the other hand, independent agents do not work exclusively for one insurance company. They can work for many companies with a wide spectrum of products. They have more freedom to offer plans that better fit their clients than the captive agents. This flexibility makes these independent agents strong competitors in the insurance industry. However, the insurance industry faces high turnover rate, and shortage of skilled insurance sales agents. The cause of shortage of skilled insurance sales agents is because many agents are retiring or about to retire. High turnover rate is due to the fact of low-income level for the entry-level sales job. A new agent could hardly make a livable wage in the first few years.

To attract and retain entry-level sales agents is possible if there are tools to help them work more effectively and efficiently. Unfortunately, insurance software applications are developed mainly with the insurance companies in mind. We believe that an independent insurance agent can thrive and be rewarded if there are tools to help them and to increase their chances of success. Hence, a personalized AI robotic process automation (RPA) that supports independent insurance sales agent (IISA Bot) is developed. RPA is essentially changing the way an independent insurance agent operates by automating and optimizing the end-to-end sales processes. The IISA Bot further offers AI-based decision-making support to the agent to maximize his revenues.

SUMMARY

Methods and systems are provided for AI-based robotic automation for persuasive references. In one novel aspect, a robotic persuasive reference is generated based on a prospect product-service (P_PS) matrix, which is generated based on predictive analysis using a deep neural network (DNN) model and dynamically obtained feedbacks. The computer system obtains one or more prospect input data sets for one or more corresponding prospects, wherein each prospect input data set includes a plurality of predefined prospect attributes, performs a predictive analysis on the one or more prospect input data sets using a deep neural network (DNN) model, wherein the DNN model is trained by a preexisting Big Data set containing a plurality of customer data sets, and generates a robotic persuasive reference identifying one or more matching products and services (PSs) for the prospect based on the P_PS matrix. In one embodiment, the DNN model is trained with customer personal profiles against associated product and service (PS) revenues for each customer data set. In one embodiment, the predictive analysis uses decision tree classifiers to recommend prospects and the potential PSs. In another embodiment, the predictive analysis is further based on a PS knowledgebase and one or more agent profiles. In yet another embodiment, one or more prospect input data sets is an augmented data set each including one or more related data sets based on one or more predefined relationship rules.

In one embodiment, the computer system detects one or more predefined triggering events comprising feedback information for the robotic persuasive reference and one or more predefined lifetime events, updates the P_PS matrix based on the one or more detected predefined triggering events, and updates the robotic persuasive reference based on the updated P_PS matrix. In one embodiment, the feedback information for the robotic persuasive reference is a sentiment analysis on responses from the prospect such as their comments to the persuasive contents. In another embodiment, the sentiment analysis is based on an audio input analysis using a speech emotion classifier. In yet another embodiment, the feedback information for the robotic persuasive reference is an overt behavior analysis based on one or more detected overt actions of the prospect. In one embodiment, a recency and frequency (RF) analysis is performed based on the one or more detected overt behavior and lifetime events. The analysis offers recommendations of prospects and their associated products and services.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
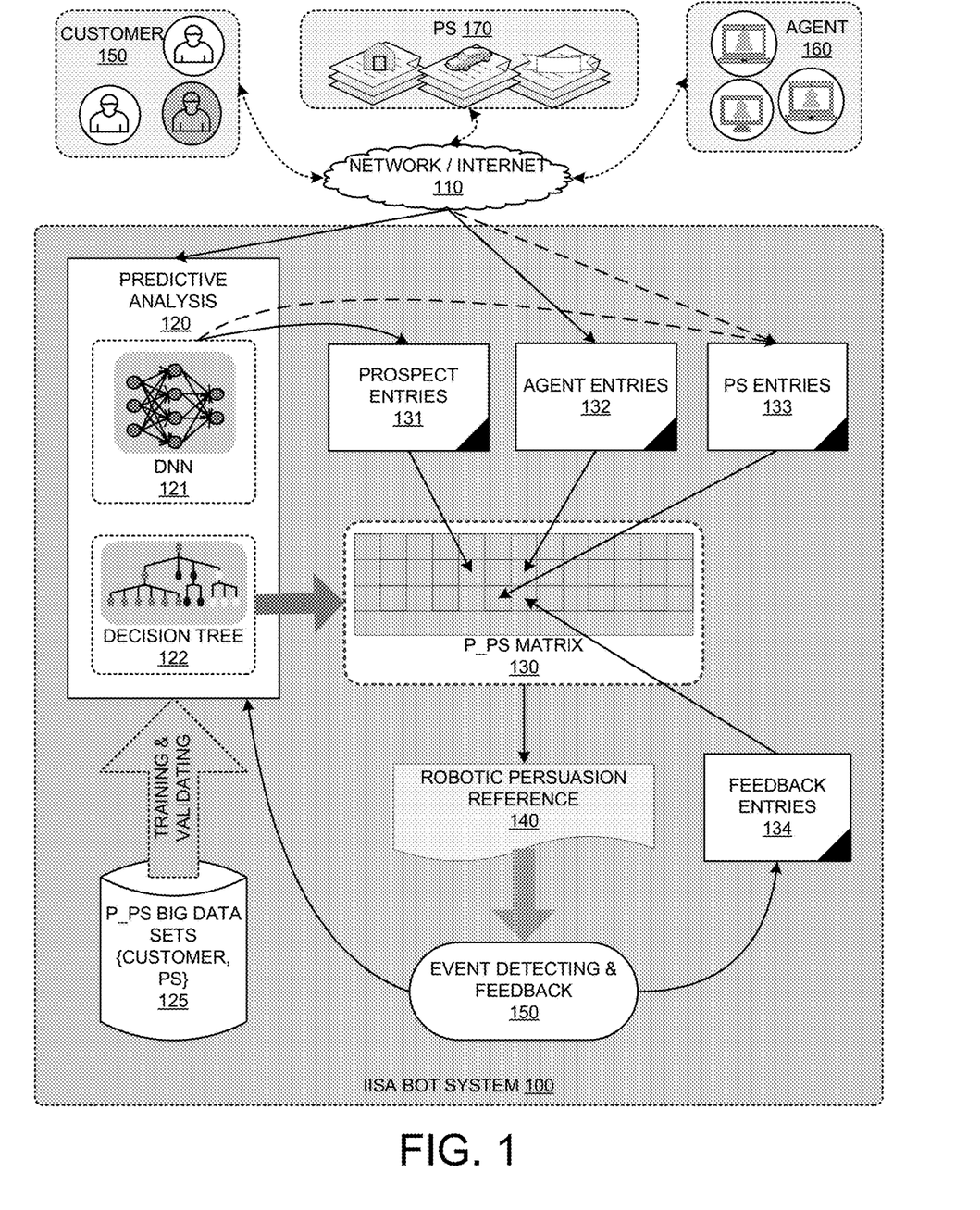
FIG. 1 illustrates exemplary diagrams for a IISA Bot system.

FIG. 1 illustrates exemplary diagrams for a robotic IISA support system. IISA Bot system 100 offers an end-to-end assistance based on AI techniques such as deep neural network (DNN), decision tree classifier, sentiment analysis and dynamic feedback and event-driven updates. IISA Bot system 100 interacts with the customers and/or prospects 150, the agent 160, products and services (PS) 170 and the network/Internet 110. In one embodiment, one or more network interfaces connect the system with a network. IISA Bot system 100 includes network interfaces, a predictive analysis module 120, a matrix module 130, a robotic module 140, and a feedback module 150. The network interfaces connect the IISA Bot system 100 with a network. An input module obtains one or more prospect input data sets for one or more corresponding prospects, wherein each prospect input data set includes a plurality of predefined prospect attributes. Analysis module 120 performs a predictive analysis on the one or more prospect input data sets using a deep neural network (DNN) model, wherein the DNN model is trained by a preexisting Big Data set containing a plurality of customer data sets. Matrix module 130 generates prospect product-service (P_PS) matrix for each prospect based on the predictive analysis and feedback attributes, wherein the feedback attributes are obtained from responses of corresponding prospects to the persuasive contents. Robotic module 150 generates a robotic persuasive reference identifying one or more matching PSs for the prospect based on the prospect product-service (P_PS) matrix. Feedback module 150 detects one or more predefined triggering events comprising feedback information for the robotic persuasive reference and one or more predefined lifetime events; updates the P_PS matrix based on the one or more detected predefined triggering events; and updates the robotic persuasive reference based on the updated P_PS matrix.

In one embodiment, predictive analysis 120 uses a DNN model 121 and a set of decision trees 122. In one embodiment, DNN model 121 is trained with personal profiles against associated PS for each customer data set in P_PS Big Data sets 125. The customer Big Data set contains large amount of customer data to train and validate DNN 121. In one embodiment, DNN model 121 is used for discovering relationships between customers and products and services (PS). P_PS Big Data sets 125, in other embodiments, further includes PS Big Data sets, which are used to train and validate DNN model 121. In one embodiment, matrix module 130 maintains a P_PS matrix, which includes prospect entries 131, agent entries 132, and PS entries 133. Prospect entries 131 are generated by predictive analysis 120. In one embodiment, IISA Bot system 100 obtains agent entries 132 and PS entries 133 through the network interface. In another embodiment, IISA Bot system 100 obtains agent entries 132 and PS entries 133 are generated by predictive analysis 120. Robotic module 140 generates robotic persuasive reference and are used by agents. The feedback obtains feedback from prospects. In one embodiment, feedback entries 134 are obtained by the feedback process and included in the P_PS matrix. The robotic module generates/updates the robotic persuasive reference based on the updated P_PS matrix.

Figure 2:
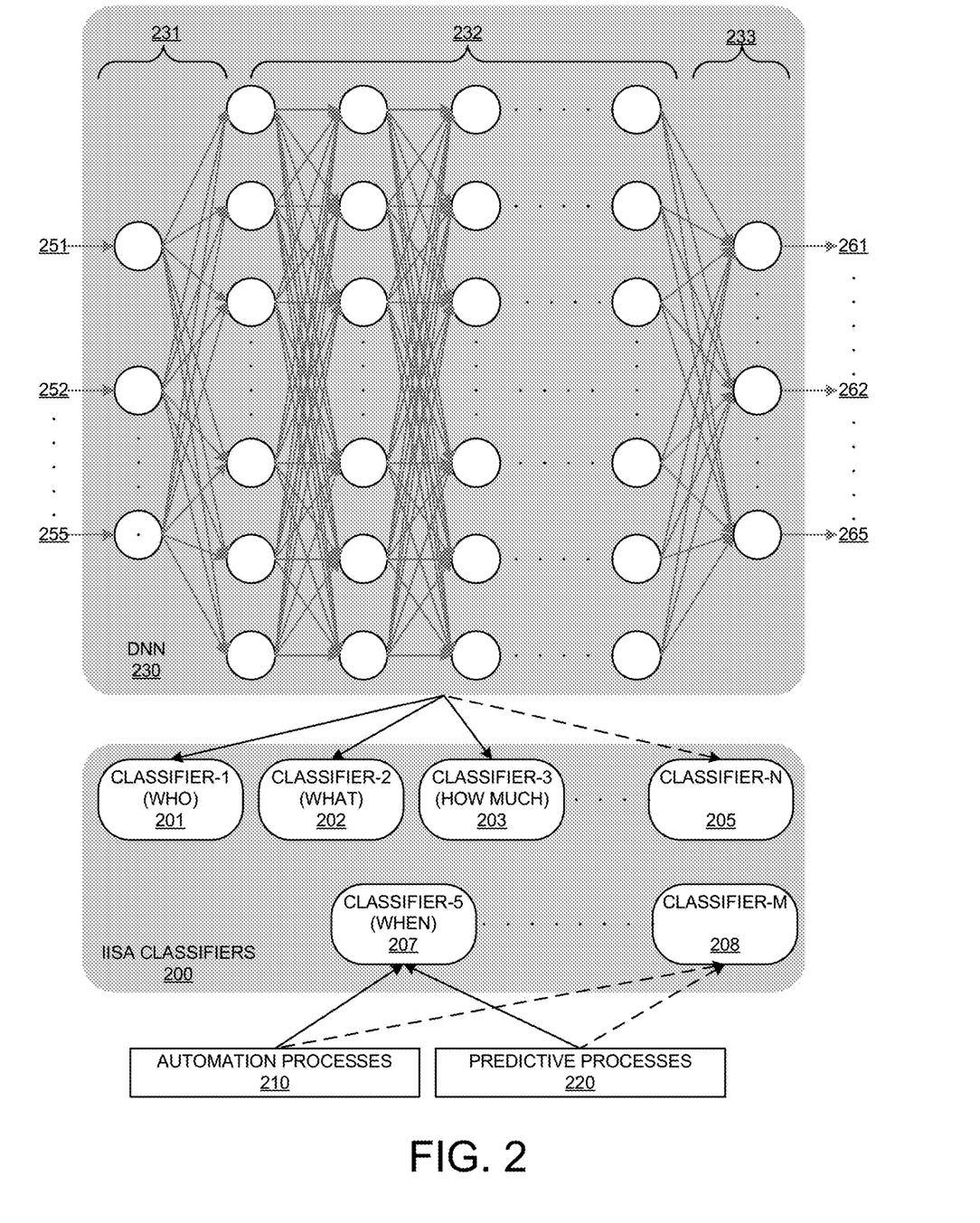
FIG. 2 illustrates exemplary diagrams of an exemplary DNN model and top-level IISA classifiers.

FIG. 2 illustrates exemplary diagrams of an exemplary DNN model and top-level IISA classifiers. IISA Bot offers an end-to-end assistance based on AI techniques such as deep neural network (DNN), decision tree classifier, and sentiment analysis. Processes 230 is a DNN that is trained with customer's demographics and purchase behavior. The DNN is used to discover potential prospects from the agent's family friends and fans (FFF) network and what products and services (PS) they will mostly buy, and how much revenues these transactions will generate. Process 210 is to automate personalized persuasion campaigns to the prospects focusing the PS they would mostly buy. Based on the personalized persuasion campaigns, Process 220 would predict the prospects who are highly likely to buy the suggested PS now. IISA classifiers 200 include a set of prospect classifiers relates to predictive prospect information, such as classifier-1 201 of Who, classifier-2 202 of What, classifier-3 203 of How Much, and classifier-n 205 of one or more other classifiers. The set of classifiers, such as classifiers 201, 202, 203, and 205, are generated by DNN 230. Other classifiers are claissifier-5 207 of When and classifier-m 208 of one or more other classifiers. The set of classifiers, such as classifiers 207 and 208 are generated by process 210 and/or 220.

DNN 230 has an input layer 231, a hidden layer 232, and an output layer 233. DNN 230 has multiple inputs including customer attribute-1 251, customer attribute-2 252, and customer-attribute-n 255. DNN 230 has multiple outputs including output-1 261, output-2 262, and output-m 265. The assumption to develop the DNN model on customer purchasing behavior is that customers with similar background will have similar behavior, i.e., purchasing similar insurance products and services. FIG. 2 depicts the supervised deep neural network (DNN) to learn the patterns of customer purchasing behavior. The inputs are the customer attributes (demographics), and the outputs are the product and service revenues (PS Revenues). The training set contains attributes such as gender, age, income, occupation, education, marital status, homeownership, residence location, mortgage, religion, ethnicity, investment profile, parent's age, parent's residence location, for himself and his parents. If he is married, the data set is augmented with the same attributed of his spouse including her parents. If he is married and has children, the dataset is further augmented to include data of the children. The DNN is trained by inputting the customer's attributes against on the insurance policies they have bought. The numbers of nodes (x) and hidden layers (y) of the DNN are parameters to be finetuned during the training process. Activation function rectified linear activation function (ReLU) is used for the hidden layer 232 and SoftMax activation function is used in the output layer 233. The SoftMax activation function used in the output layer yields the associated probability of each product and service (PS) revenues, e.g. prob(PS_1) . . . prob(PS_n).

Given the DNN outputs, the following predictive indicators will be derived, which can be used to recommend who the customers are, what products and services they will likely purchase and how much revenues these customers will create.

The expected product and service (PS) revenues for each customer: $E(Rev)=\Sigma_n\ PS \times prob(PS)$ The largest possible PS revenues that can be generated by each customer: $Max(Rev)=Max(PS_n \times prob(PS_n))$ The product and service that yields the highest revenue: $argMax(PS_n \times prob(PS_n))$ The ordered list of product and service revenues based on its associated probability: $ROL=\{rps_1, rps_2 \ldots rps_{n-1}, rps_n\}$ where $prob(rps_{n-1}) < prob(rps_n)$ and $rps_n = PS \times prob(PS_n)$ To train and validate the model, a large data set of customer attributes are used. For example, a set of customer purchase history over five years from participating insurance companies are used.

Figure 3:
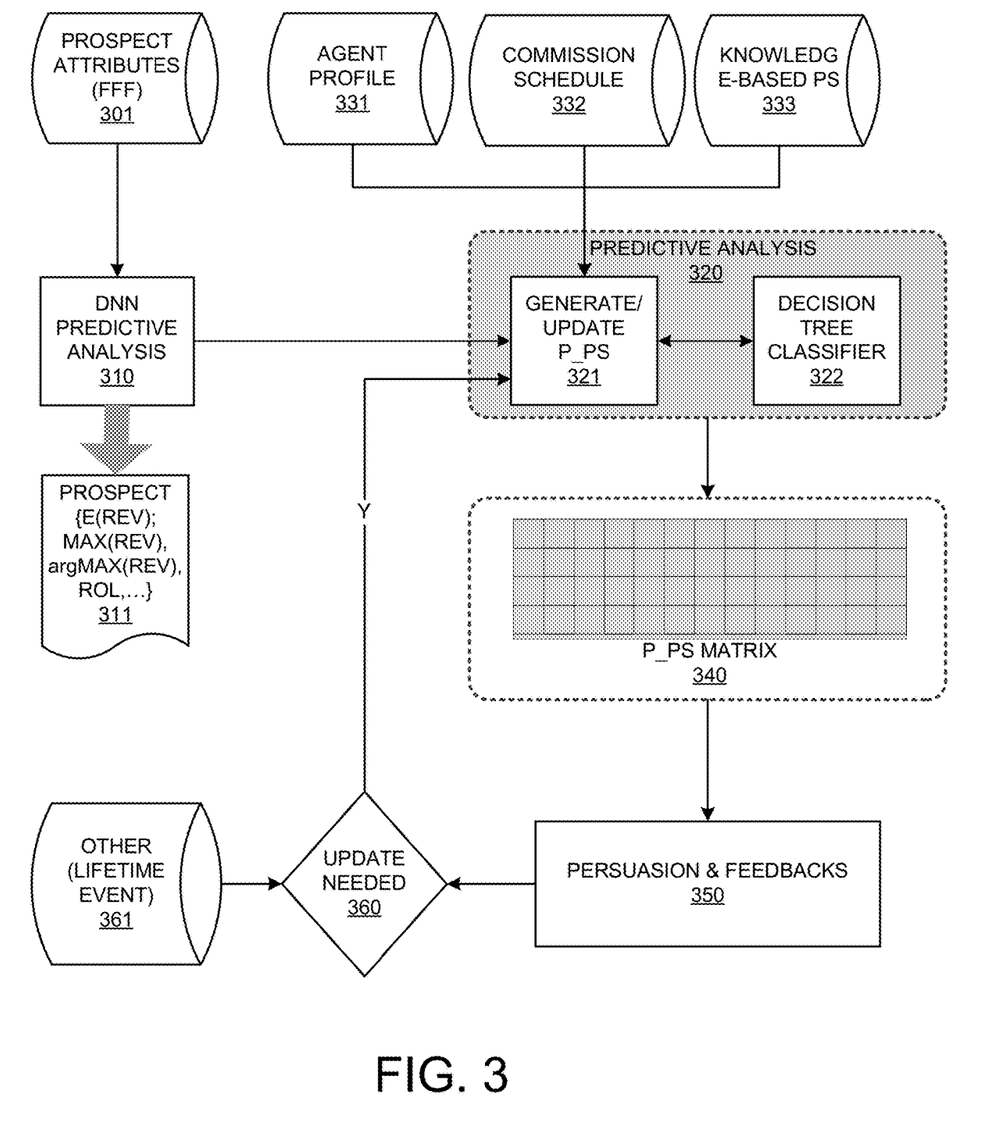
FIG. 3 illustrates exemplary diagrams for applying DNN learning model for predictive analysis to generate prospect entries to the P_PS matrix for persuasive references.

FIG. 3 illustrates exemplary diagrams for applying DNN learning model for predictive analysis to generate prospect entries to the P_PS matrix for persuasive references. At step 301, prospect attributes for one or more prospects are obtained. The prospect attributes are inputs for DNN predictive analysis 310, which output prospect information 311. Output information 311 includes exemplary predictive indicators such as, the expected product and service (PS) revenues E(Rev), the largest possible PS revenues Max(Rev), the product and service that yields the highest revenue argMax(Rev), the ordered list of product and service revenues (ROL) based on its associated probability, and others. The output 311, optionally together with one or more other information including agent profile 331, commission schedule 332, PS knowledgebase 333, are inputs for predictive analysis 320, which includes the P_PS matrix generator 321. P_PS matrix generator 321 interacts with decision tree 322 to generate P_PS matrix 340. Procedure 350 generates robotic persuasive reference and obtains feedbacks for the robotic persuasive reference. Procedure 360 analyzes the feedbacks and determines if an update is needed. Procedure 360 also monitors other events, such as lifetime events 361 for prospects to determine if updates are needed. If procedure 360 determines an updated is needed, it sends information to P_PS generator 321 for updates. For an independent sales agent, his initial leads are basically his family, friends, and fans of his social network (FFF). His clientele will expand when his FFF network grows. Once the DNN model is trained and validated, the agent collects the attributes of his prospects from his FFF network.

As an example, at step 301, attributes of people in the FFF network are collected as inputs to the deep neural network (DNN) model 310. Process 321 inputs the predictive analytics from DNN 310, the agent's profile (331), the PS's commission schedules and other monetary bonuses (332), the knowledge base on the insurance companies and the PSs they offer (333). Decision tree classifier 322 works with 321 to recommend the set of prospects and their associated list of PSs in the P_PS matrix 340. Process 350 starts the persuasion campaign using the personalized persuasion contents. The persuasion campaigns are to ascertain the level of interest, attitude, and readiness of the prospects. Process 360, upon detecting triggering event, updates the P_PS matrix 340 from the results of the persuasion campaign.

Figure 4:
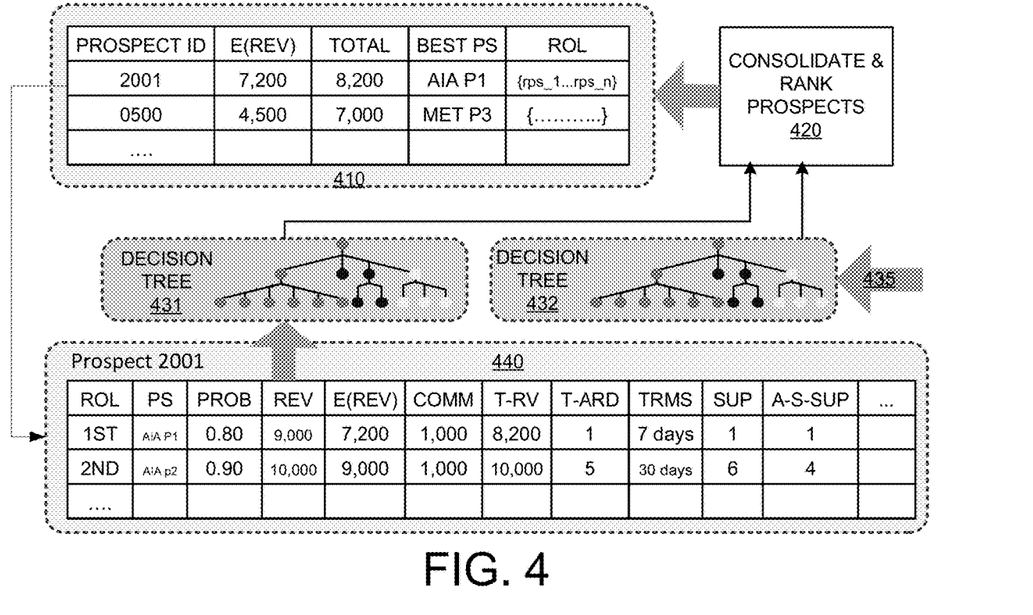
FIG. 4 illustrates exemplary diagrams of detailed procedures for the predictive analysis with decision trees classifiers to generate P_PS matrix.

FIG. 4 illustrates exemplary diagrams of detailed procedures for the predictive analysis with decision trees classifiers to generate P_PS matrix. P_PS matrix generator takes in the DNN predictive analytics, and optionally one or more inputs, such as, the commission schedule and other monetary bonuses of the associated PSs, the agent's background and preferences, and the performance measures of the insurance companies and details of their PSs from the knowledge base. The company and PS performance measures, for example, are the sales support of a PS (ranking), the reputation and history of the insurance company. Measures from the agent's profile include the agent's PS preferences, experience, and knowledge of a specific PS, etc. The summary table 410 depicts the recommendations of prospects and their potential PSs, which includes IDs for one or more prospects, and other entries, such as expected revenue E(Rev) total revenue, best PS, and ROL. For example, the best prospect of the agent is Prospect ID #2001, followed by prospect ID #0500 and so on. The best PS for Prospect 2001 (based on the decision tree classifiers with the three set of inputs) is product AIA P1, with a total revenue amounted to $8,200. The details of Prospect #2001 are shown in table 440. Table 440 contains the relevant predictive analytics from the DNN, and other inputs, such as, the agent's profile, the commissions, the PS operational measures, and insurance company measures. The more detailed table 440 of Prospect #2001 includes exemplary items such as ROL, PS, probability of success, revenue, E(Rev), commissions, total revenue, turnaround time, commission payout terms, sales support, after-sales support, and others.

In one embodiment, one or more prospect input data sets is an augmented data set each including one or more related data sets based on one or more predefined relationship rules. The augmented data set becomes inputs 435 of a decision tree classifier 431, which has been trained along with the DNN. For instance, even though the second PS, i.e., product AIA P2, of Prospect #2001 yields $10,000, a higher total revenue, but it is not considered the best choice for this agent when other factors are considered. The process is applied to each prospect to create the recommendations. The decision tree results of each prospect are collected by 435 and are processed by yet another decision tree classifier. The first decision tree, i.e., 431 is to rank the potential PS of a prospect. The second decision tree, i.e., 432 is to rank the prospects. Process 420 consolidates the outputs from these decision tree classifiers, including 431 for table 440, and 432 for other inputs. For each prospect, there will be a detailed table similar to 440. Process 420 creates an interactive dashboard for the agent, e.g., he can drill down to the details level and change his priority to suite him.

Figure 5:
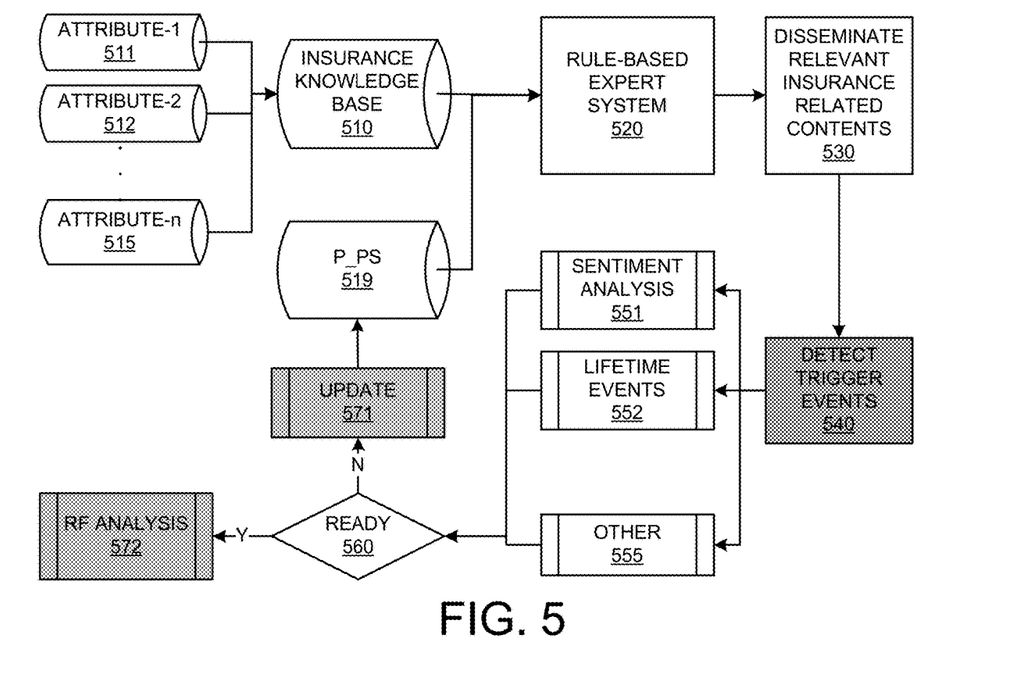
FIG. 5 illustrates exemplary diagrams for the dynamic updated P_PS matrix based on predefined triggering events including feedbacks for the persuasive reference and other lifetime events.

FIG. 5 illustrates exemplary diagrams for the dynamic updated P_PS matrix based on predefined triggering events including feedbacks for the persuasive reference and other lifetime events. In one embodiment, the P_PS matrix is dynamically updated. The IISA Bot system detects one or more predefined triggering events comprising feedback information for the robotic persuasive reference and one or more predefined lifetime events; updates the P_PS matrix based on the one or more detected predefined triggering events; and updates the robotic persuasive reference based on the updated P_PS matrix. The persuasion campaign is fully automated with an ensemble of software components including a sentimental analysis engine and a rule-based expert system to create personalized contents. The content can be simple information, sensational stories, and testimonies, or even a GoFundMe request to support people in need because they do not have insurance coverage.

A rule-based expert system 520 creates robotic persuasive references based on P_PS matrix 519 and further based on a knowledge base inputs 510. The knowledge base 510 includes one or more attributes, including attribute-1 511, attribute-2 512, and attribute-n 515. For example, the insurance knowledge base includes attributes such as the property and casualty insurance, e.g., auto, homeowner, renter, earthquake, flood, etc., health, dental, and vision insurances, life insurances, disability, retirement insurances, pets' insurances, etc. The content is created by the expert system 520 based on the prospect's background (i.e., attributes) and his responses to certain "probes", i.e., contents sent to the prospects. Process 530 disseminates relevant contents, such as insurance-related content, and pushes the personalized contents to the prospects. The robotic persuasive reference is delivered to the corresponding prospect and feedbacks are collected. In one embodiment, process 540 detects triggering events by collecting and analyzing feedbacks and other events. The triggering events includes output from sentiment analysis 551, lifetime events 552, and other events 555. In one embodiment, the process crawls prospect's behavior to obtain their responses e.g., clicking on a link, commenting on the news, discussing and/or sharing of a testimony, sharing one's own story in response to the content, or donating to a GoFundMe request, etc. These responses will be analyzed with a sentiment analysis engine 551 to determine the attitude and the readiness of the prospect. Procedure 560 determines the readiness of the prospect based on the triggering events analysis. If procedure 560 determines no, at step 571, the status is updated to the P_PS matrix 519. If procedure 560 determines yes, at step 572, a recency frequency (RF) analysis is performed.

Figure 6:
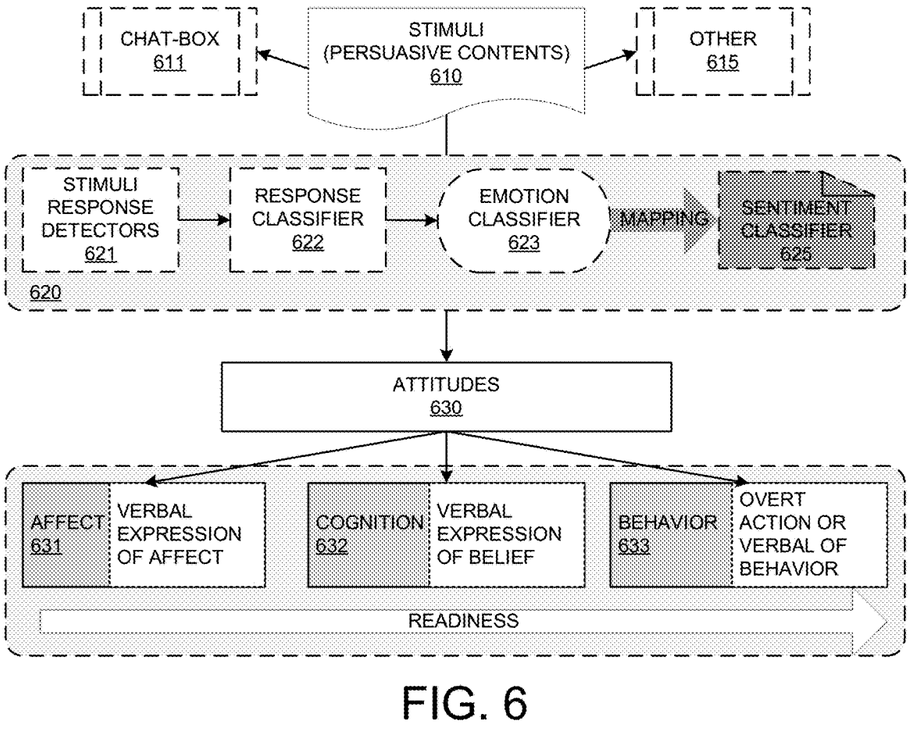
FIG. 6 illustrates exemplary diagrams for a sentiment analysis procedure to determine the readiness.

FIG. 6 illustrates exemplary diagrams for a sentiment analysis procedure to determine the readiness. The sentimental analysis engine is to monitor the change of attitude of the prospects and updates corresponding attributes in P_PS matrix. Stimuli (persuasive contents 610 act as independent variables that change one's attitude. These stimuli are the personalized contents created by the IISA Bot. The stimuli can be delivered via chat bot conversation 611, and other activities such as in-person conversation, video conversation, social media posts, etc. In one embodiment, the responses to stimuli 610 are directly identified as attitudes 630. In another embodiment, an analysis procedure 620 assigns classifiers based on responses to one or more stimuli 610. In one embodiment, a stimuli response detector 621 detects stimuli responses as inputs. A response classifier processes the detected stimuli responses captured by 621 and identifies the input classification of each input. The input classification includes audio clips, video clips, overt act responses to social media posts, and text inputs responses. Emotion classifier 623 classifies input responses based on the classification from 622. In one embodiment, emotion classifier 623 is a 1D CNN LSTM processes video/audio clips to generate speech emotion classifier result. For textual inputs, emotion classifier 623 is a textual analysis engine that generates predefined response classifiers for the responses. Overt actions include responses to social media posts, such as clicking, re-posting, and forwarding. Emotion classifier 623 assigns predefined emotion classifiers based on different overt actions. The generated response classifier is mapped to sentiment classifier 625. Optionally, the sentimental classifier is directly generated from the response classifier 623. In another embodiment, (not shown), 2D CNN LSTM can be used to take the stimuli responses, such as the audio/video clips and generates sentimental classifiers for feedbacks. In other embodiments, other AI-based analysis procedures are performed to get the attitudes 630. Attitudes 630 ranks the responses and provides feedback information for the updates.

In one embodiment, attitude 630 has three possible outcomes, namely, affect 631, cognition 632 and behavior 633. Affect 631 is when the person develops and exhibits positive attitude towards the PS. Cognition 632 is when the person starts to buy in and believes in the PS. Behavior 633 is when the person exhibits overt actions such as actively seeking and sharing insurance information, i.e., clicking/forwarding a link, attending webinars on the PS, or organizing activities related to insurance, or donating to a GoFundMe insurance related request, and so on. When a person exhibits these types of behavior, he is considering buying an insurance PS. The degree of readiness for a person to buy insurance progresses from affect to behavior. The framework, however, does not assume there is always a linear progression from affect to behavior.

Another way to determine a prospect's readiness is to identify lifetime events. Lifetime events are events that are significant to a person, for example, getting a first car, going to, or graduating from college, getting a job or a promotion, renting an apartment, buying a house, getting a pet, being hospitalized, getting married, getting a baby, death in family and friends, retirements and so on. Lifetime events essentially are the milestones that a person goes through. Every lifetime milestone has unique opportunity for selling insurance PS. IISA Bot constantly scrapes the social space of the prospects, such as in procedure 540, for lifetime events. With the help of the sentiment analysis engine, a lifetime event will trigger the sale process immediately. When a prospect exhibits overt behavior in response to the personalized contents or a lifetime event is detected, process 572 Recency Frequency (RF) analysis will determine the timing, when the prospect will likely make a purchase.

In one embodiment, the feedback information for the robotic persuasive reference is an overt behavior analysis based one or more detected overt actions of the prospect. A recency and frequency (RF) analysis is performed based on the one or more detected overt behavior. The three major behavioral responses from a prospect collected are link clicks (visiting a page), browsing time on the page, and link forwards. The RFP analysis is to collect the prospect's behavior data and categorize them into two categories: Recency and Frequency. Consider the example RF Analysis results for an agent:

TABLE-1

| | | | Recency | | | Frequency | | | | | |
|---|---|---|---|---|---|---|---|---|---|---|---|
| ID | PS | Total Rev | Click Links | Fwd Links | Brows Time | Click Links | Fwd Links | Brows Time | R-Quart | F-Quart | RF % |
| 2001 | AIA P1 | $8200 | : | : | | : | : | : | 3 | 4 | 38% |
| 0500 | Met | $7000 | : | : | | : | : | : | 1 | 2 | 11% |

TABLE-1-continued

RF Analysis

| ID | PS | Total Rev | Recency | | | Frequency | | | R-Quart | F-Quart | RF % |
|---|---|---|---|---|---|---|---|---|---|---|---|
| | | | Click Links | Fwd Links | Brows Time | Click Links | Fwd Links | Brows Time | | | |
| 2010 | P3 TIAA | $7500 | : | : | : | : | : | : | 4 | 3 | 34% |
| 0015 | P1 AIG P3 | $6500 | : | : | : | : | : | : | 2 | 1 | 17% |

As shown in Table-1, the R-Quartile and F-Quartile are numbered 1-4, as 4=best, 1=worst. Quartile=4 refers to the top 25%. In one embodiment, the RF % score is a weighted average. The weights are pre-determined based on an Analytic Hierarchy Process (AHP) from domain experts.

Recency is how recent the prospects exhibit this overt behavior. The overt measures are the number of clicks or forwards and page browsing time. Frequency is the total counts of the overt behavior. Browsing time is total number of minutes of browsing time on the pages of the links clicked (note, the personalized contents are generated per prospect per PS that is identified by the decision tree classifier. The intuition is that if a prospect shows intense interest of a PS, the recency score will be high. When the recency scores of two prospects are comparable, the frequency score becomes a determinant factor. The recency and frequency scores are a weighted average of the Click links, Forward links and page browsing time. The weights are also pre-defined by an Analytic Hierarchy Process (AHP) with the domain experts.

Among all the identified prospect-PS pairs, the quartile of the counts of each prospect will be computed whereby a quartile=4 is the top 25% while quartile=1 is the lowest 25%. A weighted average score of the R-Quartile and F-Quartile is computed with the pre-defined weights from the domain experts' AHP. Finally, the weighted averages are normalized to yield the RF %. The RF Table is the final dashboard the IISA Bot creates for the agent. In this example, The Bot identifies 4 prospects from the agent's FFF network. The agent should focus his efforts on prospects 2001 and 2010 who show signs of likely purchasing decision soon. The RF table also shows the potential payouts of these prospects so the agent can make intelligent decisions.

Figure 7:
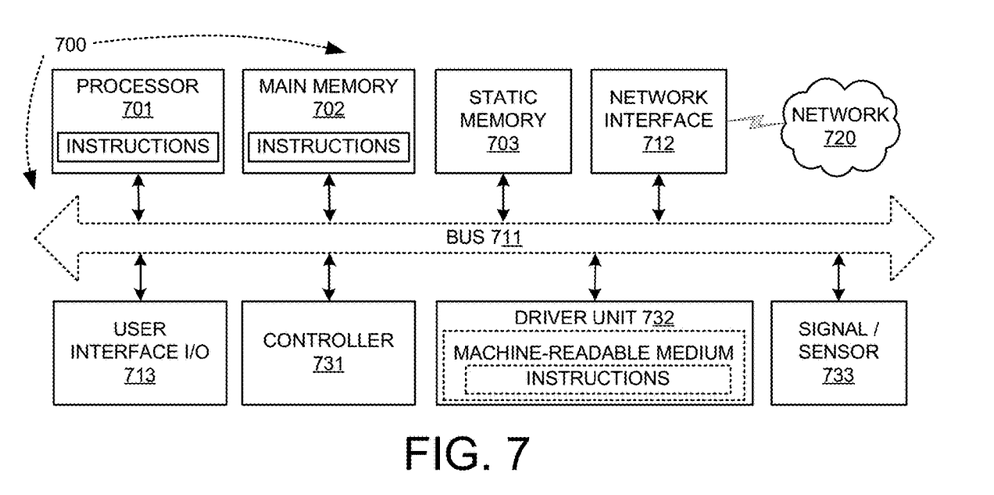
FIG. 7 illustrates an exemplary block diagram of a machine in the form of a computer system performing the AI-based robotic process automation for IISA.

FIG. 7 illustrates an exemplary block diagram of a machine in the form of a computer system performing the AI-based robotic process automation for IISA. In one embodiment, apparatus/device 700 has a set of instructions causing the device to perform any one or more methods for speech emotion recognition used for interview questions. In another embodiment, the device operates as a standalone device or may be connected through a network to other devices. Apparatus 700 in the form of computer system includes one or more processors 701, a main memory 702, a static memory unit 703, which communicates with other components through a bus 711. Network interface 712 connects apparatus 700 to network 720. Apparatus 700 further includes user interfaces and I/O component 713, controller 731, driver unit 732, and signal and/or sensor unit 733. Driver unit 732 includes a machine-readable medium on which stored one or more sets of instructions and data structures, such as software embodying or utilize by one or more methods for the speech emotion recognition function. The software may also reside entirely or partially within the main memory 702, the one or more processor 701 during execution. In one embodiment, the one or more processor 701 is configured to obtain one or more prospect input data sets for one or more corresponding prospects, wherein each prospect input data set includes a plurality of predefined prospect attributes; perform a predictive analysis on the one or more prospect input data sets using a deep neural network (DNN) model, wherein the DNN model is trained by a preexisting Big Data set containing a plurality of customer data sets; generate prospect product-service (P_PS) matrix of the prospect based on the predictive analysis and feedback attributes, wherein the feedback attributes are obtained from responses of corresponding prospects; and generate a robotic persuasive reference identifying one or more matching PSs for the prospect based on the prospect product-service (P_PS) matrix. In one embodiment, software components running the one or more processors 701 run on different network-connected devices and communicate with each other via predefined network messages. In another embodiment, the functions can be implemented in software, firmware, hardware, or any combinations.

Figure 8:
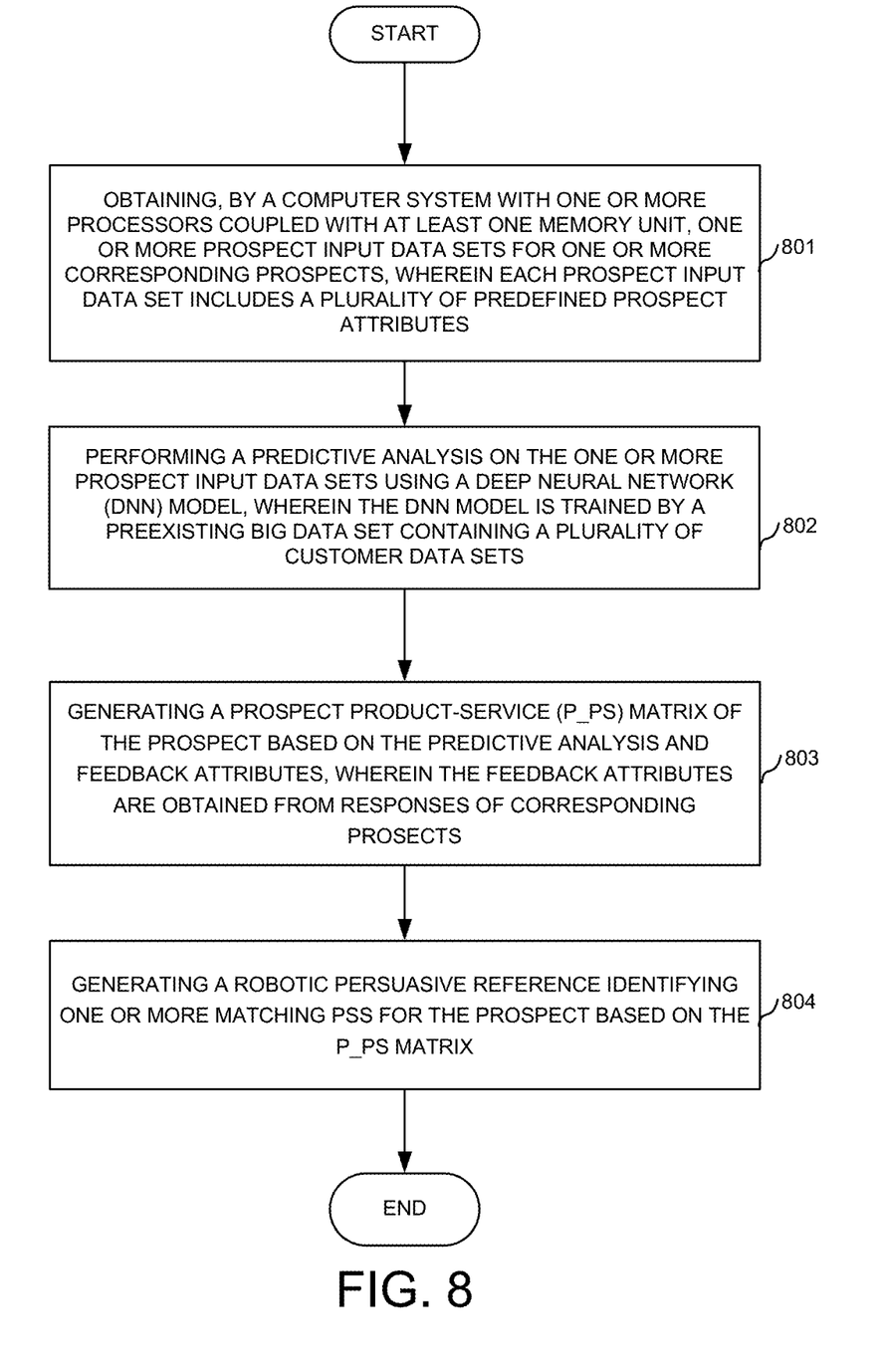
FIG. 8 illustrates an exemplary flow chart for the AI-based robotic process automation for IISA.

FIG. 8 illustrates an exemplary flow chart for the AI-based robotic process automation for IISA. At step 801, the computer system obtains one or more prospect input data sets for one or more corresponding prospects, wherein each prospect input data set includes a plurality of predefined prospect attributes. At step 802, the computer system performs a predictive analysis on the one or more prospect input data sets using a deep neural network (DNN) model, wherein the DNN model is trained by a preexisting Big Data set containing a plurality of customer data sets. At step 803, the computer system generates a prospect product-service (P_PS) matrix of the prospect based on the predictive analysis and feedback attributes, wherein the feedback attributes are obtained from responses of corresponding prospects. At step 804, the computer system generates a robotic persuasive reference identifying one or more matching PSs for the prospect based on the P_PS matrix.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    obtaining, by an independent insurance sales agent (USA) Bot computer system with one or more processors coupled with at least one memory unit, one or more prospect input data sets for one or more corresponding prospects, wherein each prospect input data set includes a plurality of predefined prospect attributes;

performing a predictive analysis on the one or more prospect input data sets using a deep neural network (DNN) model, wherein the DNN model is trained by a preexisting Big Data set containing a plurality of customer data sets;

generating a prospect product-service (P_PS) matrix of the prospect based on the predictive analysis and feedback attributes, wherein the feedback attributes are obtained from responses of corresponding prospects;

generating a robotic persuasive reference identifying one or more matching PSs for the prospect based on the P_PS matrix;

detecting one or more predefined triggering events comprising feedback information for the robotic persuasive reference and one or more predefined lifetime events;

updating the P_PS matrix based on the one or more detected predefined triggering events; and updating the robotic persuasive reference based on the updated P_PS matrix.

2. The method of claim 1, wherein the DNN model is trained with customer personal profiles against associated product and service (PS) revenues for each customer data set.

3. The method of claim 1, wherein the predictive analysis further uses one or more decision tree classifiers.

4. The method of claim 3, wherein the predictive analysis is further based on a PS knowledgebase and one or more agent profiles.

5. The method of claim 3, wherein one or more prospect input data sets is an augmented data set each including one or more related data sets based on one or more predefined relationship rules.

6. The method of claim 1, wherein the feedback information for the robotic persuasive reference is a sentiment analysis on responses from the prospect.

7. The method of claim 6, wherein the sentiment analysis is based on an audio input analysis using a sentiment classifier.

8. The method of claim 6, wherein the sentiment analysis is based on obtained textual inputs from the prospect using a set of predefined sentiment classifiers.

9. The method of claim 1, wherein the feedback information for the robotic persuasive reference is an overt behavior analysis based one or more detected overt actions of the prospect.

10. The method of claim 1, wherein a recency and frequency, (RF) analysis is performed based on one or more triggers comprising one or more detected overt actions, and the one or more detected lifetime events.

11. An independent insurance sales agent (USA) Bot system, comprising:
one or more network interfaces that connect the system with a network;
a memory; and
one or more processors coupled to one or more memory units, the one or more processors configured to obtain one or more prospect input data sets for one or more corresponding prospects, wherein each prospect input data set includes a plurality of predefined prospect attributes;

perform a predictive analysis on the one or more prospect input data sets using a deep neural network (DNN) model, wherein the DNN model is trained by a preexisting Big Data set containing a plurality of customer data sets;

generate prospect product-service (P_PS) matrix of the prospect based on the predictive analysis and feedback attributes, wherein the feedback attributes are obtained from responses of corresponding prospects;

generate a robotic persuasive reference identifying one or more matching PSs for the prospect based on the P_PS matrix;

detect one or more predefined triggering events comprising feedback information for the robotic persuasive reference and one or more predefined lifetime events; update the P_PS matrix based on the one or more detected predefined triggering events; and update the robotic persuasive reference based on the updated P_PS matrix.

12. The IISA Bot system of claim 11, wherein the DNN model is trained with personal customer profiles against associated product and service (PS) revenues for each customer data set.

13. The IISA Bot system of claim 11, wherein the predictive analysis further uses one or more decision tree classifiers.

14. The IISA Bot system of claim 13, wherein the predictive analysis is further based on a PS knowledgebase and one or more agent profiles.

15. The IISA Bot system of claim 13, wherein one or more prospect input data sets is an augmented data set each including one or more related data sets based on one or more predefined relationship rules.

16. The IISA Bot system of claim 11, wherein the feedback information for the robotic persuasive reference is a sentiment analysis on responses from the prospect.

17. The IISS Bot system of claim 11, wherein the feedback information for the robotic persuasive reference is an overt behavior analysis based one or more detected overt actions of the prospect.

18. The IISA Bot system of claim 11, wherein a recency and frequency, (RF) analysis is performed based on one or more triggers comprising one or more detected overt actions, and the one or more detected lifetime events.

19. The method of claim 16, wherein the sentiment analysis is based on an audio input analysis using a sentiment classifier.

20. The method of claim 16, wherein the sentiment analysis is based on obtained textual inputs from the prospect using a set of predefined sentiment classifiers.

* * * * *